(12) United States Patent
Heron et al.

(10) Patent No.: US 11,972,472 B2
(45) Date of Patent: *Apr. 30, 2024

(54) PRE-TRANSIT AND POST-TRANSIT FACILITATION OF IN-VEHICLE SERVICES

(71) Applicant: Kwivo, LLC, Brooklyn, NY (US)

(72) Inventors: Alexandra Kathleen Heron, Brooklyn, NY (US); Julio Toro Silva, Panama (PA); Manimeldura Janaka Mendis, Sar (BH)

(73) Assignee: Kwivo, LLC, Brooklyn, NY (US)

( * ) Notice: Subject to any disclaimer, the term of this patent is extended or adjusted under 35 U.S.C. 154(b) by 124 days.

This patent is subject to a terminal disclaimer.

(21) Appl. No.: 17/378,120

(22) Filed: Jul. 16, 2021

(65) Prior Publication Data

US 2022/0005103 A1 Jan. 6, 2022

Related U.S. Application Data

(63) Continuation of application No. 16/397,383, filed on Apr. 29, 2019, now Pat. No. 11,068,963, which is a continuation of application No. 14/291,841, filed on May 30, 2014, now Pat. No. 10,290,043, which is a continuation of application No. 13/844,089, filed on Mar. 15, 2013, now Pat. No. 8,744,926.

(51) Int. Cl.
| | | |
|---|---|---|
| G06Q 30/00 | (2023.01) | |
| G06Q 30/06 | (2023.01) | |
| G06Q 30/0601 | (2023.01) | |
| G06Q 50/28 | (2012.01) | |

(52) U.S. Cl.
CPC ......... *G06Q 30/0633* (2013.01); *G06Q 30/06* (2013.01); *G06Q 50/28* (2013.01)

(58) Field of Classification Search
CPC .................... G06Q 30/06–08; G06Q 50/28
See application file for complete search history.

(56) References Cited

U.S. PATENT DOCUMENTS

| | | |
|---|---|---|
| 4,352,200 A | 9/1982 | Oxman |
| 5,006,985 A | 4/1991 | Ehret |
| 5,445,287 A | 8/1995 | Center |

(Continued)

OTHER PUBLICATIONS

"Hawaiian Airlines Launches Redesigned 'Mea Ho'okipa Service'", unknown author, Trade Journal, Coventry, United Kingdom, Aug. 7, 2012, 2 pages.

(Continued)

*Primary Examiner* — Ethan D Civan
(74) *Attorney, Agent, or Firm* — Sheppard Mullin Richter & Hampton LLP

(57) ABSTRACT

An approach to facilitating provisioning of in-vehicle services is provided. Trip-identifying information may be obtained from a user-provided device. The trip-identifying information may identify a trip that is to occur on the vehicle. A list of in-vehicle services, which are available for the trip on the vehicle, may be determined based on the trip-identifying information. The list of in-vehicle services may be provided to the user-provided device. A selection of at least one in-vehicle service that is to be provided during the trip may be received from the user-provided device. A request for the at least one in-vehicle service may be generated based on the selection.

24 Claims, 6 Drawing Sheets

(56) References Cited

U.S. PATENT DOCUMENTS

| | | | |
|---|---|---|---|
| 5,808,661 A | 9/1998 | Infiesto | |
| 5,880,867 A | 3/1999 | Ronald | |
| 5,959,596 A | 9/1999 | Mccarten | |
| 6,094,640 A | 7/2000 | Goheen | |
| 6,445,287 B1 | 9/2002 | Schofield | |
| 6,499,027 B1 | 12/2002 | Weinberger | |
| 6,509,829 B1* | 1/2003 | Tuttle | G06Q 10/025 |
| | | | 455/100 |
| 6,559,812 B1 | 5/2003 | Mccarten | |
| 6,650,897 B2 | 11/2003 | Nelson | |
| 6,810,527 B1 | 10/2004 | Conrad | |
| 6,813,777 B1 | 11/2004 | Weinberger | |
| 6,957,772 B1 | 10/2005 | Green | |
| 6,973,479 B2 | 12/2005 | Brady | |
| 7,177,638 B2 | 2/2007 | Funderburk | |
| 7,280,825 B2 | 10/2007 | Keen | |
| 7,313,476 B2 | 12/2007 | Nichols | |
| 7,319,854 B2 | 1/2008 | Vondoenhoff | |
| 7,505,736 B2 | 3/2009 | Min | |
| 7,535,367 B2 | 5/2009 | Ratnakar | |
| 7,675,849 B2 | 3/2010 | Watson | |
| 7,725,569 B2 | 5/2010 | Brady | |
| 7,802,724 B1 | 9/2010 | Nohr | |
| 7,945,934 B2 | 5/2011 | Margis | |
| 7,984,190 B2 | 7/2011 | Rhoads | |
| 8,037,500 B2 | 10/2011 | Margis | |
| 8,103,211 B1 | 1/2012 | Fujisaki | |
| 8,180,678 B2 | 5/2012 | Brotherston | |
| 8,283,801 B2 | 10/2012 | Petitpierre | |
| 8,315,762 B2 | 11/2012 | Correa | |
| 8,322,723 B1 | 12/2012 | Bancel | |
| 8,328,094 B2 | 12/2012 | Proud | |
| 8,488,522 B2 | 7/2013 | Falchuk | |
| 8,495,239 B2 | 7/2013 | Cohen | |
| 8,719,064 B1* | 5/2014 | Heron | H04N 21/25866 |
| | | | 705/5 |
| 8,744,926 B1* | 6/2014 | Heron | G06Q 50/28 |
| | | | 705/26.7 |
| 8,751,646 B1* | 6/2014 | Heron | B64D 11/00155 |
| | | | 709/224 |
| 8,972,598 B2 | 3/2015 | Heron | |
| 9,203,721 B2 | 12/2015 | Heron | |
| 9,577,907 B2 | 2/2017 | Heron | |
| 9,929,927 B2 | 3/2018 | Heron | |
| 10,616,087 B2 | 4/2020 | Heron | |
| 11,102,101 B2 | 8/2021 | Heron | |
| 2001/0016825 A1 | 8/2001 | Pugliese | |
| 2002/0010633 A1* | 1/2002 | Brotherston | B64D 11/0015 |
| | | | 705/26.8 |
| 2002/0059614 A1 | 5/2002 | Lipsanen | |
| 2002/0100803 A1 | 8/2002 | Sehr | |
| 2002/0107916 A1 | 8/2002 | Nii | |
| 2002/0109647 A1 | 8/2002 | Crandall | |
| 2002/0170060 A1 | 11/2002 | Lyman | |
| 2003/0046438 A1 | 3/2003 | O'Donnell | |
| 2003/0046701 A1 | 3/2003 | O'Donnell | |
| 2003/0084451 A1 | 5/2003 | Pierzga | |
| 2003/0093798 A1 | 5/2003 | Rogerson | |
| 2003/0158762 A1 | 8/2003 | Wu | |
| 2003/0208579 A1 | 11/2003 | Brady | |
| 2004/0039617 A1 | 2/2004 | Maycotte | |
| 2005/0056696 A1 | 3/2005 | Green | |
| 2005/0091086 A1 | 4/2005 | Moore | |
| 2005/0132407 A1 | 6/2005 | Boyer | |
| 2005/0192741 A1 | 9/2005 | Nichols | |
| 2006/0010438 A1 | 1/2006 | Brady | |
| 2006/0032979 A1 | 2/2006 | Mitchell | |
| 2006/0040612 A1 | 2/2006 | Min | |
| 2006/0041374 A1 | 2/2006 | Inoue | |
| 2006/0055532 A1 | 3/2006 | Li | |
| 2006/0072919 A1 | 4/2006 | Edelist | |
| 2006/0109107 A1 | 5/2006 | Staton | |
| 2006/0163868 A1 | 7/2006 | Baumann | |
| 2007/0097893 A1 | 5/2007 | Rodriguez | |
| 2007/0168205 A1 | 7/2007 | Carlson | |
| 2007/0264999 A1 | 11/2007 | Radpour | |
| 2008/0024270 A1 | 1/2008 | Katagiri | |
| 2008/0121757 A1 | 5/2008 | Pozzi | |
| 2008/0132212 A1 | 6/2008 | Lemond | |
| 2008/0133705 A1 | 6/2008 | Lemond | |
| 2008/0141314 A1 | 6/2008 | Lemond | |
| 2008/0141315 A1 | 6/2008 | Ogilvie | |
| 2008/0219154 A1 | 9/2008 | Durrey | |
| 2008/0221753 A1 | 9/2008 | Kellner | |
| 2008/0270686 A1 | 10/2008 | Grannan | |
| 2009/0094635 A1 | 4/2009 | Aslin | |
| 2009/0112377 A1 | 4/2009 | Schalla | |
| 2009/0133112 A1 | 5/2009 | Kauffman | |
| 2009/0187640 A1 | 7/2009 | Delia | |
| 2009/0279483 A1 | 11/2009 | Falchuk | |
| 2010/0070376 A1 | 3/2010 | Proud | |
| 2010/0070565 A1 | 3/2010 | Leblanc | |
| 2010/0138582 A1 | 6/2010 | Bird | |
| 2010/0162325 A1 | 6/2010 | Bonar | |
| 2010/0216401 A1 | 8/2010 | Kitahara | |
| 2010/0299207 A1 | 11/2010 | Harlev | |
| 2011/0107377 A1 | 5/2011 | Petrisor | |
| 2011/0196754 A1* | 8/2011 | Proud | G06Q 20/202 |
| | | | 705/16 |
| 2011/0264474 A1 | 10/2011 | Lefkowitz | |
| 2012/0004804 A1 | 1/2012 | Beams | |
| 2012/0030708 A1 | 2/2012 | Margis | |
| 2012/0071151 A1 | 3/2012 | Abramson | |
| 2012/0232791 A1 | 9/2012 | Sterkel | |
| 2012/0298737 A1 | 11/2012 | Thakar | |
| 2013/0005336 A1 | 1/2013 | Ayotte | |
| 2013/0117338 A1 | 5/2013 | Lynch | |
| 2013/0139269 A1* | 5/2013 | Shaikh | H04N 21/8355 |
| | | | 726/26 |
| 2013/0149958 A1 | 6/2013 | Davis | |
| 2013/0157687 A1 | 6/2013 | Mori | |
| 2013/0173796 A1 | 7/2013 | Grab | |
| 2014/0068010 A1 | 3/2014 | Nicholson | |
| 2014/0278767 A1 | 9/2014 | Heron | |
| 2014/0279219 A1 | 9/2014 | Heron | |
| 2014/0280491 A1 | 9/2014 | Heron | |
| 2014/0280928 A1 | 9/2014 | Heron | |
| 2015/0170121 A1 | 6/2015 | Heron | |
| 2015/0355988 A1 | 12/2015 | Lee | |
| 2016/0164763 A1 | 6/2016 | Heron | |
| 2017/0250931 A1 | 8/2017 | Ioannou | |

OTHER PUBLICATIONS

Liu et al., "Toward Next-Generation In-Flight Entertainment Systems: A Survey of the State of the Art and Possible Extensions", Advances in Semantic Media Adaptation and Personalization, 2008, pp. 95-111 (9 pages).

Lui-Kwan, "In-Flight Entertainment: The Sky's the Limit", Entertainment Computing, Oct. 2000, pp. 98-101.

Walker, Ben, "Buy Before You Fly", Caterer & Hotelkeeper, vol. 193, Issue 4329, Sutton, United Kingdom, Jun. 2004, 6 pages.

* cited by examiner

PRE-TRANSIT AND POST-TRANSIT FACILITATION OF IN-VEHICLE SERVICES

CROSS-REFERENCE TO RELATED APPLICATIONS

This application is a continuation of U.S. patent application Ser. No. 16/397,383, filed on Apr. 29, 2019, entitled "PRE-TRANSIT AND POST-TRANSMIT FACILITATION OF IN-VEHICLE SERVICES", which is a continuation of U.S. patent application Ser. No. 14/291,841, filed on May 30, 2014, entitled "PRE-TRANSIT AND POST-TRANSIT FACILITATION OF IN-VEHICLE SERVICES" (which issued as U.S. Pat. No. 10,290,043 on May 14, 2019), which is a continuation of U.S. patent application Ser. No. 13/844,089, filed on Mar. 15, 2013, entitled "PRE-TRANSIT AND POST-TRANSIT FACILITATION OF IN-VEHICLE SERVICES" (which issued as U.S. Pat. No. 8,744,926 on Jun. 3, 2014), which is related to U.S. patent application Ser. No. 13/843,864, filed Mar. 15, 2013, entitled "IN-VEHICLE SERVICES FOR USER-PROVIDED DEVICES" (which issued as U.S. Pat. No. 8,972,598 on Mar. 3, 2015), U.S. patent application Ser. No. 13/843,990, filed Mar. 15, 2013, entitled "IN-VEHICLE SERVICES THROUGH ATTENDANT DEVICES, USER-PROVIDED DEVICES, AND/OR AN IN-VEHICLE COMPUTER SYSTEM" (which issued as U.S. Pat. No. 8,751,646 on Jun. 10, 2014), and U.S. patent application Ser. No. 13/844,169, filed Mar. 15, 2013, entitled "ADMINISTRATION AND CUSTOMIZATION PLATFORM FOR IN-VEHICLE-SERVICES" (which issued as U.S. Pat. No. 8,719,064 on May 6, 2014), the contents of which are hereby incorporated herein by reference in their entirety.

FIELD OF THE DISCLOSURE

This disclosure relates generally to pre-transit and post-transit facilitation of in-vehicle services for transit on a vehicle.

BACKGROUND

Transit providers, such as taxi companies, limousine companies, bus companies, railway companies, airlines, etc., may install in-vehicle entertainment and service systems in their vehicles to entertain their passengers, to enable attendants to better serve the passengers, etc., during transit on the vehicles. For example, commercial planes are generally equipped with in-flight entertainment (IFE) systems to accommodate their passengers' desire for entertainment while in-transit to their destinations. However, among other issues, typical transit providers do not provide their passengers with a convenient way of enabling their passengers to select or prepare, before departure of a vehicle, in-vehicle services that they are to be provided during transit on the vehicle, or to extend those in-vehicle services after the passengers leave the vehicle.

SUMMARY

One aspect of the disclosure relates to a system configured to facilitate provisioning of in-vehicle services, in accordance with one or more implementations. In exemplary implementations, trip-identifying information may be obtained from one or more user-provided devices to determine a list of in-vehicle services for a trip that is identified in the trip-identify information. The list of in-vehicle services may be provided to the user-provided device to enable a selection of at least one in-vehicle service to be provided during the trip. In this way, for instance, the system enables users (e.g., passengers or other users) to select or prepare, before the departure of the vehicle, in-vehicle services that they are to be provided during transit on the vehicle.

In some implementations, the system may include one or more servers. The server(s) may be configured to communicate with one or more client computing devices according to a client/server architecture. The users may access the system via the client computing devices. The client computing devices may include one or more user-provided devices.

The server(s) may be configured to execute one or more computer program modules to facilitate provisioning of in-vehicle services. The computer program modules may include one or more of a pre-departure module, a post-arrival module, and/or other modules.

The pre-departure module may be configured to obtain trip-identifying information from a user-provided device. The trip-identifying information may, for instance, identify a trip that is to occur on the vehicle. In some implementations, the trip-identifying information may comprise a carrier identifier that identifies a carrier, a trip identifier that identifies the trip, and/or a passenger identifier that identifies a passenger.

The pre-departure module may be configured to determine a list of in-vehicle services, which are available for the trip on the vehicle, based on the trip-identifying information. In certain implementations, the list of in-vehicle services may comprise one or more content items that include video content, audio content, image content, an electronic book, a game, an advertisement, an application, or other content items. In some implementations, the list of in-vehicle services may comprise one or more service items that include a food, a beverage, earphones, a pillow, a blanket, Internet service, or other service items.

The pre-departure module may be configured to provide the list of in-vehicle services to the user-provided device. In various implementations, the pre-departure module may be configured to provide the list of in-vehicle services such that the list of in-vehicle services is provided to the user-provided device before a boarding time associated with the trip. In some implementation, the pre-departure module may be configured to provide the list of in-vehicle services such that the list of in-vehicle services is provided to the user-provided device after a boarding time associated with the trip, but before departure of the vehicle.

The pre-departure module may be configured to receive, from the user-provided device, a selection of at least one in-vehicle service that is to be provided during the trip. In one implementation, the pre-departure module may be configured to generate a request for the at least one in-vehicle service based on the selection. In some implementations, the pre-departure module may be configured to cause the request to be communicated to an in-vehicle computer system that provides the selected at least one in-vehicle service.

In certain implementations, the selected at least one in-vehicle service may include a content item to be provided by an in-vehicle computer system during the trip. The in-vehicle computer system may not have the selected content item stored in a memory of the in-vehicle computer system. In some implementations, the pre-departure module may be configured to determine that the content item is not available at the in-vehicle computer system. The pre-departure module may obtain the content item, for instance, based on the determination that the content item is not available at the in-vehicle computer system. The pre-departure module may be configured to provide the content item to the in-vehicle computer system for provisioning by the in-vehicle computer system to the user-provided device.

In various implementations, the selected at least one in-vehicle service may include a content item. In one implementation, the pre-departure module may be configured to obtain the content item based on the request, and provide the content item to the user-provided device (e.g., directly to the user-provided device, via the in-vehicle computer system, etc.).

In some implementations, the selected at least one in-vehicle service may include a content item that is to expire such that the content item stored in the user-provided device is to become inaccessible based on a time criteria and/or a location criteria. In certain implementations, the post-arrival module may be configured to determine that the content item has expired. In one implementation, the post-arrival module may be configured to cause the content item to be inaccessible at the user-provided device.

In various implementations, the pre-departure module may be configured to obtain passenger-identifying information that identifies a passenger. The pre-departure module may be configured to determine a special status of the passenger based on the passenger-identifying information. The pre-departure module may be configured to offer at least one service item for the passenger based on the special status. In one implementation, the at least one service item may be reserved for passengers having the special status.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
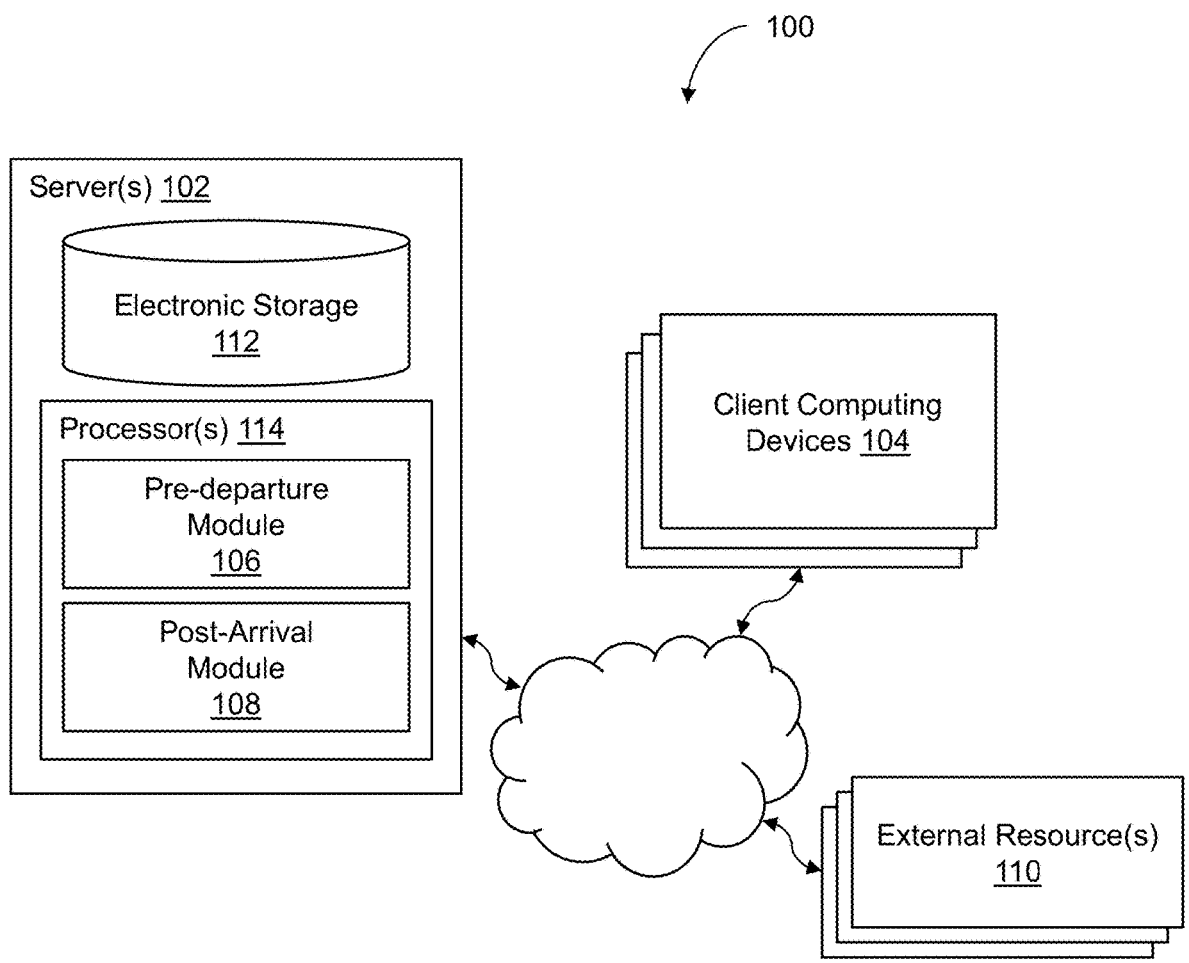
FIG. 1 illustrates a system configured to facilitate provisioning of in-vehicle services, in accordance with one or more implementations.

FIG. 1 illustrates a system 100 configured to facilitate provisioning of in-vehicle services, in accordance with one or more implementations. In some implementations, system 100 may include one or more servers 102. Server(s) 102 may be configured to communicate with one or more client computing devices 104 according to a client/server architecture. The users may access system 100 via client computing devices 104. Client computing devices 104 may include one or more user-provided devices.

As used herein, a user-provided device is provided by a user during transit on a vehicle (e.g., a user-provided device may be owned by the user and brought onto the vehicle by the user, may be owned by a transit provider and rented by the user, etc.). The user-provided device may include applications for in-vehicle services as well as other user applications unrelated to the in-vehicle services. The user-provided device may not be a dedicated device for use with the in-vehicle computer system. By way of example, the one or more user-provided devices may include one or more of laptop computers, tablet computers, netbooks, smartphones, or other computing devices that are provided by one or more users during transit on a vehicle.

Server(s) 102 may be configured to execute one or more computer program modules to facilitate provisioning of in-vehicle services. The computer program modules may include one or more of a pre-departure module 106, a post-arrival module 108, and/or other modules.

Pre-departure module 106 may be configured to obtain trip-identifying information from a user-provided device. The trip-identifying information may, for instance, identify a trip that is to occur on the vehicle. In some implementations, the trip-identifying information may comprise a carrier identifier that identifies a carrier, a trip identifier that identifies the trip, and/or a passenger identifier that identifies a passenger. It is noted that, in various implementations, the trip-identifying information may be obtained from other sources, such as an in-vehicle computer system, a local kiosk (e.g., at an airport, bus station, etc.), or other computer systems (e.g., airport computer system, bus station computer system, etc.).

Pre-departure module 106 may be configured to determine a list of in-vehicle services, which are available for the trip on the vehicle, based on the trip-identifying information. In certain implementations, the list of in-vehicle services may comprise one or more content items that include video content, audio content, image content, an electronic book, a game, an advertisement, an application, or other content items. In some implementations, the list of in-vehicle services may comprise one or more service items that include a food, a beverage, earphones, a pillow, a blanket, Internet service, or other service items. In various implementations, the list of in-vehicle services may include access to services, such as shopping (e.g., transit provider store, a third party store, etc.), chatting (e.g., text, voice, video, etc.), or other services. In one implementation, at least some of the in-vehicle services may be provided for free. For example, at least some of the in-vehicle services may be provided at no costs to passengers. In another implementation, at least some of the in-vehicle services may be provided at cost. For example, the passengers may be required to pay to obtain the in-vehicle services.

Pre-departure module 106 may be configured to provide the list of in-vehicle services to the user-provided device. In various implementations, pre-departure module 106 may be configured to provide the list of in-vehicle services such that the list of in-vehicle services is provided to the user-provided device before a boarding time associated with the trip. By way of example, a passenger associated with the user-provided device may be determined to be within a predetermined pre-boarding time period, and the list of in-vehicle services may be provided to the user-provided device based on the determination that the passenger is within the predetermined pre-boarding time period. In this way, one or more relevant lists of in-vehicle services may be provided to the user-provided devices in accordance with the pre-boarding time period so that the passengers associated with the user-provided devices may be presented with the relevant list of in-vehicle services to choose from. In one use case, during the pre-boarding time period, the user-provided devices may be provided with a list of available seat upgrades associated with special in-vehicle services that are reserved for passengers with those seat upgrades. As such, transit providers may be able to sell the available seat upgrades to the passengers via the convenience of their own user-provided devices.

By way of another example, the passenger may be provided with a first list of in-vehicle services before a first boarding time associated with a trip and provided with a second list of in-vehicle services before a second boarding time associated with the trip. In one use case, for instance, the passenger may be taking a trip that includes multiple stops or the use of multiple vehicles for the trip. Thus, in some scenarios, the passenger may be provided a list of in-vehicle services before boarding of another vehicle or re-boarding of a vehicle.

In some implementation, pre-departure module 106 may be configured to provide the list of in-vehicle services such that the list of in-vehicle services is provided to the user-provided device after a boarding time associated with the trip, but before departure of the vehicle. For example, a passenger associated with the user-provided device may be determined to be within a predetermined boarding time period, and the list of in-vehicle services may be provided to the user-provided device based on the determination that the passenger is within the predetermined boarding time period. In this way, one or more relevant lists of in-vehicle services may be provided to the user-provided devices in accordance with the boarding time period so that the passengers associated with the user-provided devices may be presented with the relevant list of in-vehicle services to choose from.

In one scenario, during the boarding time period of an airplane, the user-provided devices may be provided with a list of non-electronic content items (e.g., paper books, puzzles, playing cards, etc.). The passengers may, for instance, be more likely to buy those items during the boarding time period than other periods associated with their trip because there is a significant period of time in which the passengers are unable to use their electronic devices (e.g., a time period time immediately after departure of the airplane) and may want the non-electronic content items to pass the time.

In some implementations, pre-departure module 106 may be configured to provide a list of in-vehicle services to the user-provided device after a landing of the vehicle but before disembarking of a passenger associated with the user-provided device, after the landing and after disembarking of the passenger, or other event.

Pre-departure module 106 may be configured to receive, from the user-provided device, a selection of at least one in-vehicle service that is to be provided during the trip. In one implementation, pre-departure module 106 may be configured to generate a request for the at least one in-vehicle service based on the selection. In some implementations, pre-departure module 106 may be configured to cause the request to be communicated to an in-vehicle computer system that provides the selected at least one in-vehicle service.

Figure 2:
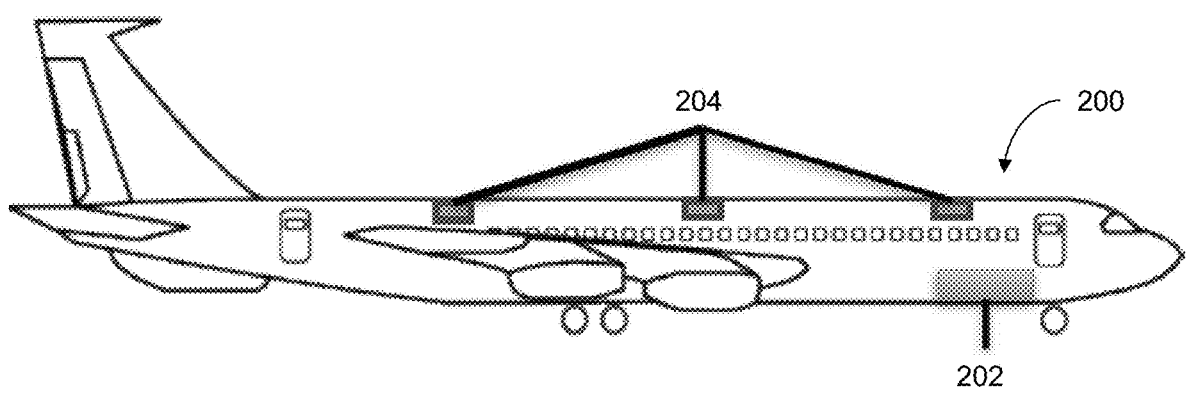
FIG. 2 illustrates a diagram of an in-vehicle computer system on a vehicle, in accordance with one or more implementations.

For example, FIG. 2 illustrates a diagram of an in-vehicle computer system 200 on a vehicle (e.g., a plane), in accordance with one or more implementations. As shown, in-vehicle computer system 200 includes an electronic equipment (EE) bay 202 and wireless access points (WAPs) 204. EE bay 202 may include one or more servers for facilitating provisioning in-vehicle services to passengers via their user-provided devices or other devices. In one use case, the one or more servers of the in-vehicle computer system 200 may handle requests to provision the selected at least one in-vehicle service for one or more passengers. For example, if the provisioning of the selected at least one in-vehicle service include provisioning of content items, the servers of the in-vehicle computer system 200 may provide or reserve one or more content items that are stored at the in-vehicle computer system 200 to/for user-provided devices after the passengers have boarded, after the vehicle has departed, or after one or more other triggering events. If the provisioning of the selected at least one in-vehicle service include provisioning of service items, the servers of the in-vehicle computer system 200 may communicate requests of the service items to attendants on board the vehicle at an appropriate time (e.g., before boarding, after boarding and before departure, after departure, after arrival at the destination, etc.).

In certain implementations, the selected at least one in-vehicle service may include a content item to be provided by an in-vehicle computer system during the trip. The in-vehicle computer system may not have the selected content item stored in a memory of the in-vehicle computer system. In some implementations, pre-departure module 106 may be configured to determine that the content item is not available at the in-vehicle computer system. Pre-departure module 106 may obtain the content item, for instance, based on the determination that the content item is not available at the in-vehicle computer system. Pre-departure module 106 may be configured to provide the content item to the in-vehicle computer system for provisioning by the in-vehicle computer system to the user-provided device. In this way, passengers may receive their selected content items at their user-provided devices via the in-vehicle computer system at the appropriate time (e.g., after the airplane is safely in the air), without having to waste their cell data usage on the content (e.g., by avoiding download of content from the Internet via their cell data plans), or at a faster download speed (e.g., wireless in-vehicle network may transmit movies or other large content items to the user-provided devices at rapid speeds compared with speeds of a cellular data network).

In one scenario, with respect to FIG. 2, the servers of EE bay 202 may be configured to store one or more content items, for instance, to enable passengers of the user-provided devices to obtain access to the one or more content items without an Internet connection or otherwise a connection to a network external to the vehicle. For example, in-vehicle computer system 200 may utilize WAPs 204 to facilitate one or more communication sessions through which in-vehicle computer system 200 may communicate with the one or more user-provided devices or other devices, or through which the one or more user-provided devices may communicate with in-vehicle computer system 200, one or more other user-provided devices, or other devices. These communications may, for instance, include the receipt of content items at the user-provided devices.

In another scenario, when a passenger associated with the user-provided device selects content items to be provided by the in-vehicle computer system, pre-departure module 106 may create one or more private channels for the passenger based on the selected content items. The one or more private channels may, for instance, be configured such that passenger may use the user-provided device to access the private channels before boarding the vehicle, after boarding the vehicle, during designated times (e.g., only during transit on the vehicle, while the passenger is in-transit, etc.), or at any time (e.g., the private channels created for the passenger may be persistent channels accessible by the passenger at any time). In yet another scenario, pre-departure module 106 may utilize preference information associated with the passenger to create the private channels that are customized for the passenger.

In various implementations, the selected at least one in-vehicle service may include a content item. In one implementation, pre-departure module 106 may be configured to obtain the content item based on the request, and provide the content item to the user-provided device (e.g., directly to the user-provided device, via the in-vehicle computer system, etc.). In another implementation, pre-departure module 106 may be configured to provide the content item to the user-provided device such that the content item becomes accessible at the user-provided device after boarding of the vehicle or during transit on the vehicle.

In one scenario, for instance, a passenger associated with the user-provided device at an airport may interact with pre-departure module 106 (e.g., hosted at a local kiosk, a remote central computer system, etc.) to preload movies, episodes, video clips, games, e-books, or other content items onto the user-provided device. However, while the content item may be stored on the user-provided device, the passenger may not be able to play or otherwise access the content item until the passenger boards her plane.

In some implementations, the selected at least one in-vehicle service may include a content item that is to expire such that the content item stored in the user-provided device is to become inaccessible based on a time criteria and/or a location criteria. By way of example, in one implementation, the content item may be configured such that the content item becomes inaccessible via the user-provided device based on a passenger associated with the user-provided device no longer being in transit. In one use case, the content item may include the estimated arrival time of the passenger at one of her destination stops or her final destination at the expiration time. If, for instance, the passenger attempts to access the content item after the estimated arrival time, the content item may not be played or otherwise be presented (e.g., an application on the user-provided device may know not to present the content item, the application may delete the content item upon the attempted access, etc.).

In certain implementations, post-arrival module 108 may be configured to determine that the content item has expired. In one implementation, post-arrival module 108 may be configured to cause the content item to be inaccessible at the user-provided device. For example, post-arrival module 108 may be configured to cause the content item to be inaccessible at the user-provided device based on the determination that the content item has expired. In one scenario, if the expiration time associated with the content item is when the passenger is no longer in transit, post-arrival module 108 may provide the user-provided device with an indication to delete or disable the content item when post-arrival module 108 determines that the passenger is no longer in transit. An application (or other agent) of the user-provided device may receive the indication and delete/disable the content item from/on the user-provided device.

In one implementation, post-arrival module 108 may be configured to offer to extend or remove the expiration associated with the content item based on a determination that the content item is about to or has expired. For example, content items that are "rented" to the passengers may expire after the vehicle has arrived at one of the destination stops or the final destination. Upon arrival, post-arrival module 108 may offer the passengers via their user-provided devices the chance to purchase and keep their "rented" content items such that the content items will permanently remain accessible to the passengers from their user-provided devices.

In another implementation, at least some content items may be provided to the passengers via their user-provided devices for free. For example, content items may be provided to the user-provided devices for free without the passengers incurring costs for the content items. Those content items may be accessible by the passengers during transit on the vehicle, while waiting to board the vehicle at the boarding gate, or during other times/locations. In some scenarios, those content items may remain accessible by the passengers from their user-provided devices without having to incur costs (e.g., associated with renting, purchasing, etc.). In one scenario, transit providers may provide free transit-provider magazines, free advertisement content, etc. In another scenario, transit providers may be provide one or more free movies, episodes, video clips, games, applications, or other content items.

In certain implementations, post-arrival module 108 may provide the passengers via their user-provided devices one or more content items relating to post-arrival assistance. For example, post-arrival module 108 may provide the passengers with a map of the destination airport, a map of the destination area, an application that offers interactive travel guides, or other post-arrival assistance-related content items.

In some implementations, post-arrival module 108 may provide the passengers via their user-provided devices one or more content items that relate to surveying the passengers. In one use case, post-arrival module 108 may provide the user-provided devices with an application that enables the passengers to rate the attendants, the facilitates, the entertainment, etc., associated with the transit of the passengers.

In various implementations, pre-departure module 106 may be configured to obtain passenger-identifying information that identifies a passenger. The passenger-identifying information may, for instance, be obtained from the user-provided device, the in-vehicle computer system on which a passenger associated with the user-provided device is to board for the trip, or other source. Pre-departure module 106 may be configured to determine a special status of the passenger based on the passenger-identifying information. For example, the passenger may be a user of the user-provided device. Pre-departure module 106 may be configured to offer at least one service item for the passenger based on the special status. In one implementation, the at least one service item may be reserved for passengers having the special status. The offering of the at least one service item may be communicated to an in-vehicle computer system on the vehicle which the passenger is to board for the trip to cause the in-vehicle compute system to provision the at least one service item for the passenger.

It is noted that, in some implementations, the list of in-vehicle services may be provided to an in-vehicle computer system, a local kiosk (e.g., at an airport, bus station, etc.), or other computer systems (e.g., airport computer system, bus station computer system, etc.). In one implementation, the selection of the at least one in-vehicle service may be received from the in-vehicle computer system, the local kiosk, or other computer systems. For example, a kiosk at an airport gate may receive the list of in-vehicle services, and a passenger may utilize the kiosk to select the in-vehicle services that she desires. Based on the selection, the selected in-vehicle services may be provided to the passenger.

Server(s) 102, client computing devices 104, external resources 110, and/or other components may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing devices 104, external resources 110, and/or other components may be operatively linked via some other communication media.

A given client computing device 104 may include one or more processors configured to execute computer program modules. The computer program modules may be configured to enable an expert or user associated with client computing device 104 to interface with system 100 and/or external resources 110, and/or provide other functionality attributed herein to client computing devices 104. By way of example, client computing device 104 may include one or more of a desktop computer, a laptop computer, a tablet computer, a netbook, a smartphone, or other computing devices.

External resources 110 may include sources of information, hosts and/or providers outside of system 100, external entities participating with system 100, and/or other resources. In some implementations, some or all of the functionality attributed herein to external resources 110 may be provided by resources included in system 100.

In some implementations, server(s) 102 may include an electronic storage 112, one or more processor(s) 114, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 112 may comprise non-transitory storage media that electronically stores information. The electronic storage media of electronic storage 112 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 112 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 112 may include one or more virtual storage resources (e.g., cloud storage, a virtual private network, and/or other virtual storage resources). Electronic storage 112 may store software algorithms, information determined by processor(s) 114, information received from server(s) 102, information received from client computing devices 104, and/or other information that enables server(s) 102 to function as described herein.

Processor(s) 114 is configured to provide information processing capabilities in server(s) 102. As such, processor(s) 114 may include one or more of a digital processor, an analog processor, a digital circuit designed to process information, an analog circuit designed to process information, a state machine, and/or other mechanisms for electronically processing information. Although processor(s) 114 is shown in FIG. 1 as a single entity, this is for illustrative purposes only. In some implementations, processor(s) 114 may include a plurality of processing units. These processing units may be physically located within the same device, or processor(s) 114 may represent processing functionality of a plurality of devices operating in coordination. Processor(s) 114 may be configured to execute modules 106, 108, and/or other modules. Processor(s) 114 may be configured to execute modules 106, 108, and/or other modules by software; hardware; firmware; some combination of software, hardware, and/or firmware; and/or other mechanisms for configuring processing capabilities on processor(s) 114.

It should be appreciated that although modules 106 and 108 are illustrated in FIG. 1 as being co-located within a single processing unit, in implementations in which processor(s) 114 includes multiple processing units, one or more of modules 106 and/or 108 may be located remotely from the other modules. The description of the functionality provided by the different modules 106 and/or 108 described below is for illustrative purposes, and is not intended to be limiting, as any of modules 106 and/or 108 may provide more or less functionality than is described. For example, one or more of modules 106 and/or 108 may be eliminated, and some or all of its functionality may be provided by other ones of modules 106 and/or 108. As another example, processor(s) 114 may be configured to execute one or more additional modules that may perform some or all of the functionality attributed below to one of modules 106 and/or 108.

Figure 3A:
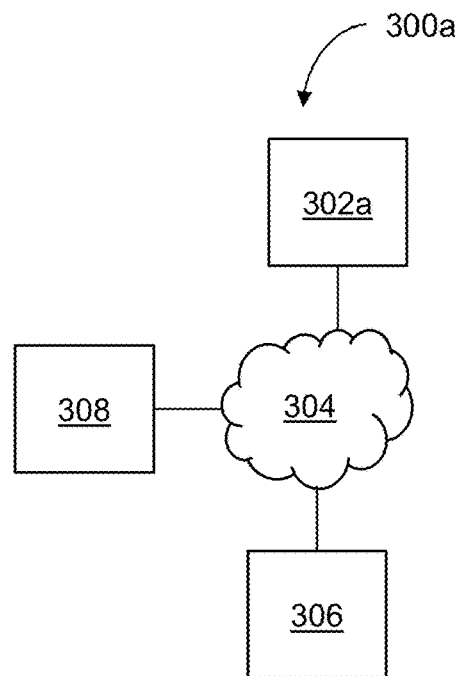
FIGS. 3A-3C illustrate diagrams of network architectures for facilitating provisioning of in-vehicle services, in accordance with one or more implementations.
Figure 3B:
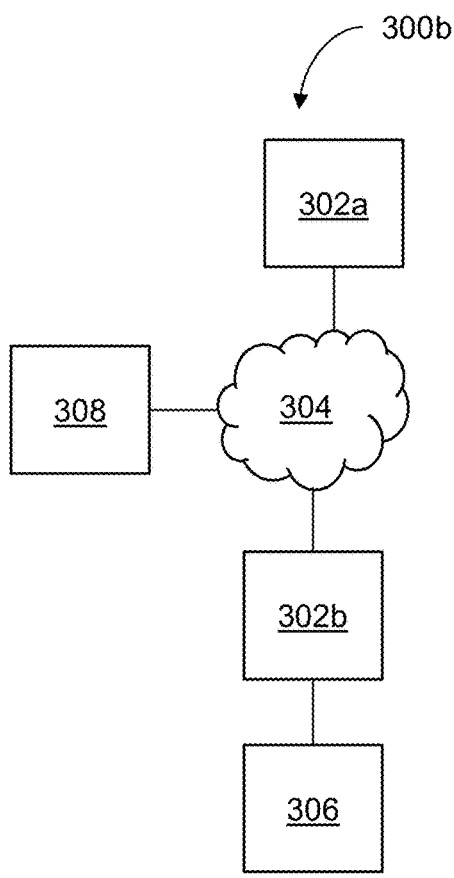
Figure 3C:
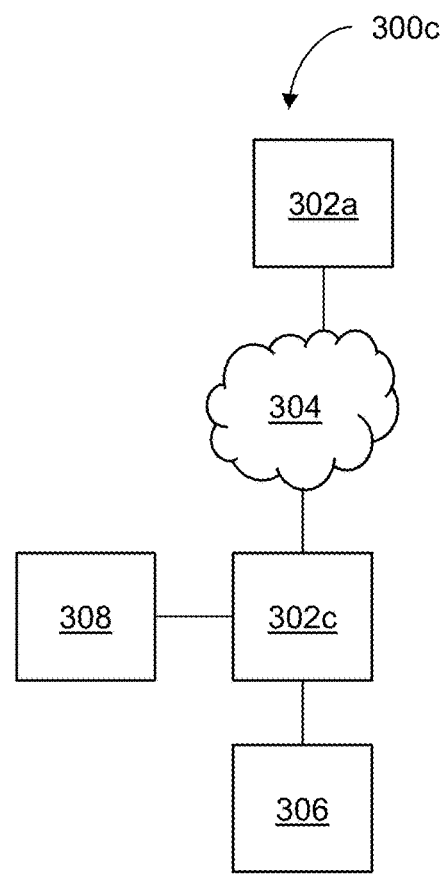

FIGS. 3A-3C illustrate diagrams of network architectures 300 for facilitating provisioning of in-vehicle services, in accordance with one or more implementations. As discussed, the one or more computer program modules of server(s) 102 may communicate with user-provide devices, an in-vehicle computer system, or other components of the system 100. For example, a selection of an in-vehicle service may be received by server(s) 102, which may then generate a request for the one in-vehicle service based on the selection and cause the request to be communicated to the in-vehicle computer system. For illustrative purposes, in this particular scenario, server(s) 102 are discussed with respect to be located at computer systems 302a, 302b, or 302c.

With respect to FIG. 3A, server(s) 102 may be located at computer system 302a which may communicate via non-local area network 304 (e.g., the Internet) with user-provided device 306 and in-vehicle computer system 308 (e.g., on a plane). With respect to FIG. 3B, server(s) 102 may be located at computer system 302b. Because computer system 302b may be connected to user-provided device 306 directly or via a wired/wireless local area network, user-provided device 306 may obtain content items or otherwise communicate with the server(s) 102 without necessarily connecting to the Internet. Computer system 302b may, for instance, be in-airport computer system, a kiosk at an airport, or other local devices. In one use case, where computer system 302b is a kiosk that offers content, passengers or other users may utilize their user-provided devices 306 to obtain content items (e.g., movies, episodes, video clips, songs, games, e-book, etc.) directly from the kiosk. The offered content items may be purchased or rented from the kiosk. The offered content items may be immediately accessible (e.g., before boarding), accessible while in-transit on a vehicle associated with in-vehicle computer system 308 (e.g., pre-loaded on the user-provided device 306, but becoming accessible while in-transit after boarding the plane), accessible during a particular time period (e.g., between boarding time and arrival time), or accessible in accordance with other criteria.

With respect to FIG. 3C, server(s) 102 may be located at computer system 302c. Computer system 302c may, for instance, be collocated with the in-vehicle computer system (e.g., in the plane) or may be a separate computer system. If computer system 302c is a separate computer system from in-vehicle computer system 308, server(s) 102 may nonetheless communicate with in-vehicle computer system 308 without an Internet connection, for instance, when the plane hosting in-vehicle computer system 308 arrives at the airport at which the computer system 302c is located.

Figure 4:
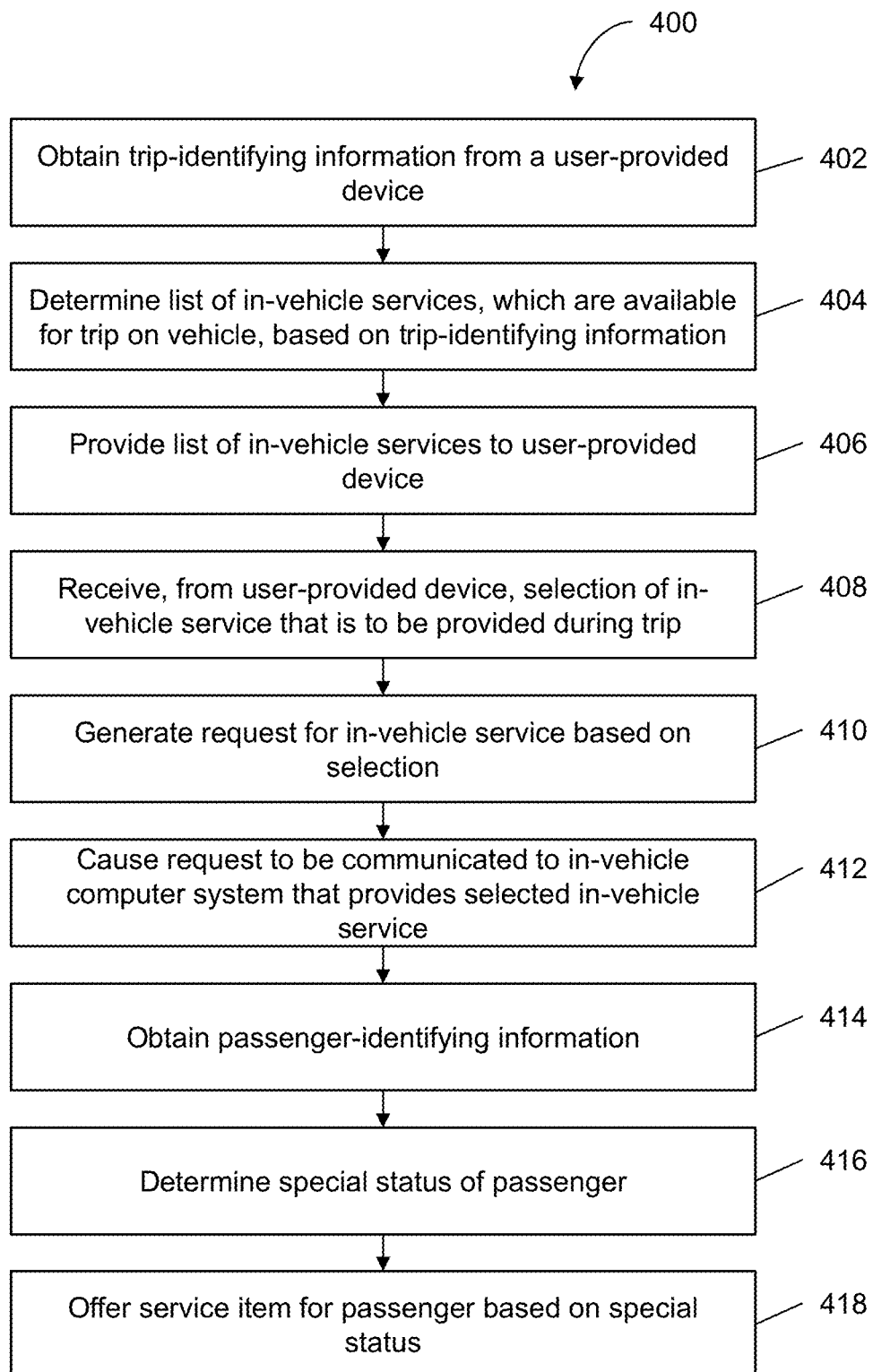
FIG. 4 illustrates a method for facilitating provisioning of in-vehicle services, in accordance with one or more implementations.

FIG. 4 illustrates a method for facilitating provisioning of in-vehicle services, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, trip-identifying information may be obtained from a user-provided device. The trip-identifying information may identify a trip that is to occur on the vehicle. In some implementations, the trip-identifying information may comprise a carrier identifier that identifies a carrier, a trip identifier that identifies the trip, and/or a passenger identifier that identifies a passenger. Operation 402 may be performed by a pre-departure module that is the same as or similar to pre-departure module 106, in accordance with one or more implementations.

At an operation 404, a list of in-vehicle services, which are available for the trip on the vehicle, may be determined based on the trip-identifying information. In certain implementations, the list of in-vehicle services may comprise one or more content items that include video content, audio content, image content, an electronic book, a game, an advertisement, an application, or other content items. In some implementations, the list of in-vehicle services may comprise one or more service items that include a food, a beverage, earphones, a pillow, a blanket, Internet service, or other service items. Operation 404 may be performed by a pre-departure module that is the same as or similar to pre-departure module 106, in accordance with one or more implementations.

At an operation 406, the list of in-vehicle services may be provided to the user-provided device. Operation 406 may be performed by a pre-departure module that is the same as or similar to pre-departure module 106, in accordance with one or more implementations. In various implementations, with respect to operation 406, the list of in-vehicle services may be provided such that the list of in-vehicle services is provided to the user-provided device before a boarding time associated with the trip. By way of example, a passenger associated with the user-provided device may be determined to be within a predetermined pre-boarding time period, and the list of in-vehicle services may be provided to the user-provided device based on the determination that the passenger is within the predetermined pre-boarding time period.

In some implementation, with respect to operation 406, the list of in-vehicle services may be provided such that the list of in-vehicle services is provided to the user-provided device after a boarding time associated with the trip, but before departure of the vehicle. For example, a passenger associated with the user-provided device may be determined to be within a predetermined boarding time period, and the list of in-vehicle services may be provided to the user-provided device based on the determination that the passenger is within the predetermined boarding time period.

At an operation 408, a selection of at least one in-vehicle service that is to be provided during the trip may be received from the user-provided device. Operation 408 may be performed by a pre-departure module that is the same as or similar to pre-departure module 106, in accordance with one or more implementations.

At an operation 410, a request for the at least one in-vehicle service may be generated based on the selection. Operation 410 may be performed by a pre-departure module that is the same as or similar to pre-departure module 106, in accordance with one or more implementations.

At an operation 412, the request may be caused to be communicated to the in-vehicle computer system that provides the selected at least one in-vehicle service. In some implementations, the request may be caused to be communicated to the in-vehicle computer system to cause the in-vehicle computer system to provision the selected at least one in-vehicle service for a passenger associated with the user-provided device. Operation 412 may be performed by a pre-departure module that is the same as or similar to pre-departure module 106, in accordance with one or more implementations.

At an operation 414, passenger-identifying information may be obtained. In some implementations, the passenger-identifying information may be obtained from the user-provided device, the in-vehicle computer system on which a passenger associated with the user-provided device is to board for the trip, or other source. Operation 414 may be performed by a pre-departure module that is the same as or similar to pre-departure module 106, in accordance with one or more implementations.

At an operation 416, a special status of a passenger may be determined. In certain implementations, the special status of the passenger may be determined based on the passenger-identifying information. The passenger may, for instance, be a user of the user-provided device. Operation 416 may be performed by a pre-departure module that is the same as or similar to pre-departure module 106, in accordance with one or more implementations.

At an operation 418, at least one service item may be offered for the passenger based on the special status. The at least one service item may, for instance, be reserved for passengers having the special status. In various implementations, the offering of the at least one service item may be communicated to an in-vehicle computer system on the vehicle which the passenger is to board for the trip. In some implementation, the offering of the at least one service item may be communicated to the in-vehicle computer system to cause the in-vehicle compute system to provision the at least one service item for the passenger. Operation 418 may be performed by a pre-departure module that is the same as or similar to pre-departure module 106, in accordance with one or more implementations.

Figure 5:
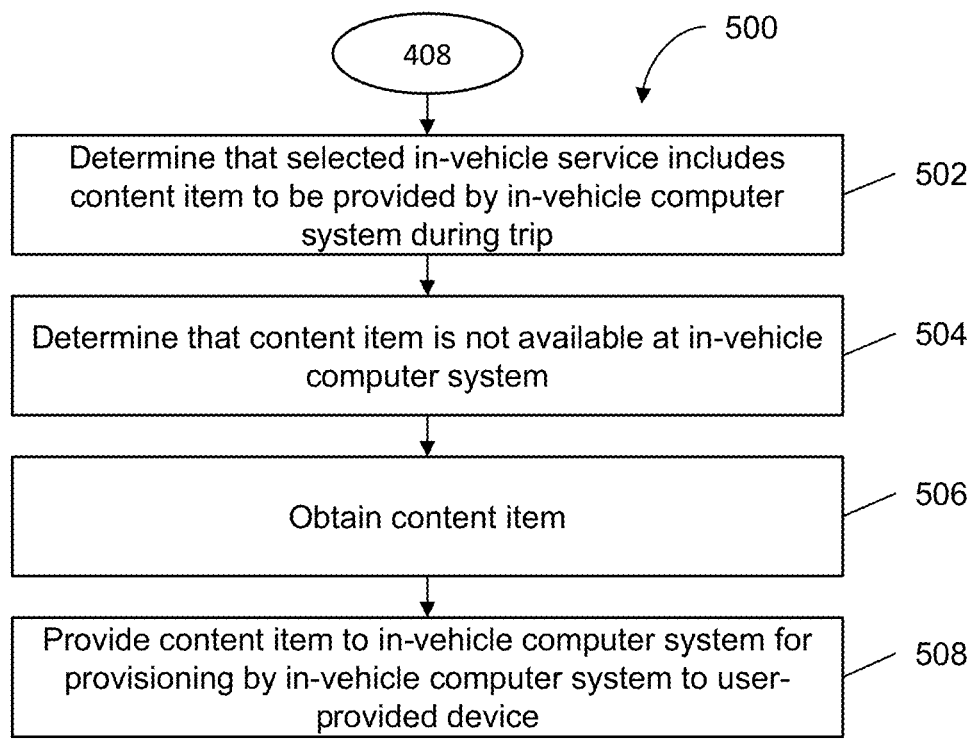
FIG. 5 illustrates a method for facilitating provisioning of content items by an in-vehicle computer system, in accordance with one or more implementations.

FIG. 5 illustrates a method for facilitating provisioning of content items by an in-vehicle computer system, in accordance with one or more implementations. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, the selected at least one in-vehicle service (e.g., selected at operation 408) may be determined to include a content item to be provided by an in-vehicle computer system during the trip. The content item may, for instance, include video content, audio content, image content, an electronic book, a game, and/or an advertisement. Operation 502 may be performed by a pre-departure module that is the same as or similar to pre-departure module 106, in accordance with one or more implementations.

At an operation 504, the content item may be determined to not be available at the in-vehicle computer system. In some implementations, the content may be determined to not be currently available at the in-vehicle computer system based on a determination that the in-vehicle computer system does not have the selected content item stored in a memory of the in-vehicle computer system. Operation 504 may be performed by a pre-departure module that is the same as or similar to pre-departure module 106, in accordance with one or more implementations.

At an operation 506, the content item may be obtained. In some implementations, the content item may be obtained via a third party content store or other source (e.g., the content item may be locally stored on a network server). Operation 506 may be performed by a pre-departure module that is the same as or similar to pre-departure module 106, in accordance with one or more implementations.

At an operation 508, the content item may be provided to the in-vehicle computer system for provisioning by the in-vehicle computer system to the user-provided device. Operation 508 may be performed by a pre-departure module that is the same as or similar to pre-departure module 106, in accordance with one or more implementations.

Figure 6:
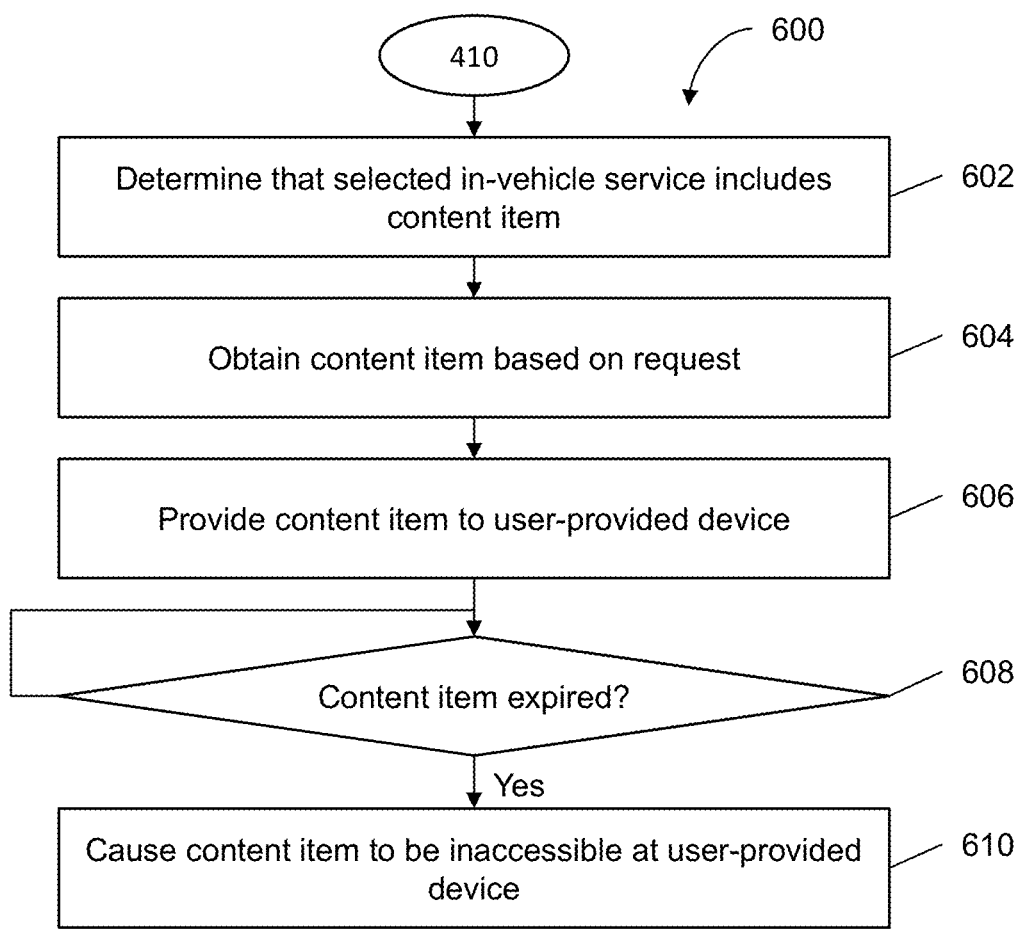
FIG. 6 illustrates a method for facilitating expiration of content items, in accordance with one or more implementations.

FIG. 6 illustrates a method for facilitating expiration of content items, in accordance with one or more implementations. The operations of method 600 presented below are intended to be illustrative. In some implementations, method 600 may be accomplished with one or more additional operations not described, and/or without one or more of the operations discussed. Additionally, the order in which the operations of method 600 are illustrated in FIG. 6 and described below is not intended to be limiting.

In some implementations, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At an operation 602, the selected at least one in-vehicle service (e.g., indicated in the request generated at operation 410) may be determined to include a content item. In some implementations, the content item may expire such that the content item stored in the user-provided device is to become inaccessible based on a time criteria and/or a location criteria. The content item may, for instance, include video content, audio content, image content, an electronic book, a game, and/or an advertisement. Operation 602 may be performed by a pre-departure module that is the same as or similar to pre-departure module 106, in accordance with one or more implementations.

At an operation 604, the content item may be obtained based on the request. Operation 604 may be performed by a pre-departure module that is the same as or similar to pre-departure module 106, in accordance with one or more implementations.

At an operation 606, the content item may be provided to the user-provided device. In some implementations, the content item may be provided to the user-provided device such that the content item becomes accessible at the user-provided device after a boarding of the vehicle or during transit on the vehicle. Operation 606 may be performed by a pre-departure module that is the same as or similar to pre-departure module 106, in accordance with one or more implementations.

At an operation 608, a determination of whether the content item has expired may be effectuated. Operation 608 may be performed by a post-arrival module that is the same as or similar to post-arrival module 106, in accordance with one or more implementations. Responsive to a determination that the content item has expired, method 600 may proceed to an operation 610.

At operation 610, the content item may be caused to be inaccessible at the user-provided device. In some implementations, an indication may be provided to the user-provided device to delete the content item from the user-provided device or disable access to the content item. Operation 610 may be performed by a post-arrival module that is the same as or similar to post-arrival module 106, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method of facilitating provisioning of content items by an in-vehicle computer system on a vehicle, the method being implemented by a computer system that includes one or more physical processors executing one or more computer program instructions which, when executed, perform the method, the method comprising:

obtaining, by the computer system, trip-identifying information relating to a passenger that is associated with a user-provided device, wherein the trip-identifying information identifies a trip that is to occur on the vehicle;

determining, by the computer system, that a current time is within a predetermined time period related to the trip;

determining, by the computer system, based on the trip-identifying information and determination of whether the current time is within the predetermined time period, a list of content items that are available for the trip to be provisioned by the in-vehicle computer system to the user-provided device;

providing, by the computer system, the list of content items to the user-provided device;

receiving, at the computer system, from the user-provided device, a selection of at least one content item from the list of content items;

generating, by the computer system, a request for the selected at least one content item based on the selection;

determining, by the computer system, that the requested at least one content item is not stored in a memory of the in-vehicle computer system in response to the request for the at least one content item;

obtaining, by the computer system and based on the determination that the requested at least one content item is not stored in the memory of the in-vehicle computer system, the requested at least one content item from a source via a network; and storing, by the computer system, the obtained at least one content item in a memory of the in-vehicle computer system for provisioning by the in-vehicle computer system to the user-provided device at a second time after the current time.

2. The method of claim 1, wherein the trip-identifying information comprises at least one of a carrier identifier that identifies a carrier, a trip identifier that identifies the trip, or a passenger identifier that identifies a passenger.

3. The method of claim 1, wherein the list of content items comprises at least one of video content, audio content, image content, an electronic book, a game, an advertisement, or an application.

4. The method of claim 1, the method further comprising: causing, by the computer system, the request to be communicated to the in-vehicle computer system on the vehicle.

5. The method of claim 1, wherein the computer system comprises an intermediary computer device located at a facility for boarding of the vehicle, wherein the list of content items is provided to the user-provided device via the intermediary computer device, and wherein the selection of the at least one content item is received at the intermediary computer device, the method further comprising:

providing, by the intermediary computer device, the request for the selected at least one content item to the in-vehicle computer system on the vehicle.

6. The method of claim 1, further comprising:

providing, by the computer system, the obtained at least one content item is to the user-provided device at the second time;

storing, by the computer system, the obtained at least one content item in a memory of the user-provided device; and preventing, by the computer system playback of the obtained at least one content item by the user-provided device until at least a third time after the second time.

7. The method of claim 6, further comprising:

determining, by the computer system, that the current time is after the third time; and enabling, by the computer system and based on the determination that the current time is after the third time, playback access of the obtained at least one content item via the user-provided device.

8. A system for facilitating provisioning of content items by an in-vehicle computer system on a vehicle, the system comprising:

one or more physical processors programmed with one or more computer program instructions which, when executed, cause the one or more physical processors to:

obtain trip-identifying information relating to a passenger that is associated with a user-provided device, wherein the trip-identifying information identifies a trip that is to occur on the vehicle;

determine that a current time is within a predetermined time period related to the trip;

determine, based on the trip-identifying information and determination of whether the current time is within the predetermined time period, a list of content items that are available for the trip to be provisioned by the in-vehicle computer system to the user-provided device;

provide the list of content items to the user-provided device;

receive, from the user-provided device, a selection of at least one content item from the list of content items;

generate a request for the at selected least one content item based on the selection;

determine that the at least one content item is not stored in a memory of the in-vehicle computer system in response to the request for the at least one content item;

obtain, based on the determination that the requested at least one content item is not stored in the memory of the in-vehicle computer system, the requested at least one content item from a source via a network; and store the obtained at least one content item in a memory of the in-vehicle computer system for provisioning by the in-vehicle computer system to the user-provided device at a second time after the current time.

9. The system of claim 8, wherein the trip-identifying information comprises at least one of a carrier identifier that identifies a carrier, a trip identifier that identifies the trip, or a passenger identifier that identifies a passenger.

10. The system of claim 8, wherein the list of content items comprises at least one of video content, audio content, image content, an electronic book, a game, an advertisement, or an application.

11. The system of claim 8, wherein the one or more physical processors are further caused to: cause the request to be communicated to the in-vehicle computer system on the vehicle.

12. The system of claim 8, wherein the system comprises an intermediary computer device located at a facility for boarding of the vehicle, wherein the list of content items is provided to the user-provided device via the intermediary computer device, wherein the selection of the at least one content item is received at the intermediary computer device, and wherein the intermediary computer device is caused to:
provide the request for the selected at least one content item to the in-vehicle computer system on the vehicle.

13. The system of claim 8, further comprising:
provide the obtained at least one content item to the user-provided device at the second time;
store the obtained at least one content item in a memory of the user-provided device;
prevent playback of the obtained at least one content item by the user-provided device until at least a third time after the second time.

14. The system of claim 13, further comprising:
determine that the current time is after the third time; and
enable, based on the determination that the current time is after the third time, playback access of the obtained at least one content item via the user-provided device.

15. A method of facilitating provisioning of in-vehicle services, the in-vehicle services being requested from one or more user-provided devices prior to the departure of a vehicle in which the in-vehicle services are provided, the method being implemented by a computer system that includes one or more physical processors executing one or more computer program instructions which, when executed, perform the method, the method comprising:
obtaining, by the computer system, trip-identifying information relating to a passenger that is associated with a user-provided device, wherein the trip-identifying information identifies a trip that is to occur on the vehicle;
determining, by the computer system, based on the trip-identifying information, a list of in-vehicle services that are available for the trip;
determining, by the computer system, that a current time is within a predetermined boarding or pre-boarding time period associated with the trip;
providing, by the computer system, the list of in-vehicle services to the user-provided device based on the determination that the current time is within the predetermined boarding or pre-boarding time period;
receiving, by the computer system, a selection of at least one in-vehicle service from the user-provided device; and
generating, by the computer system, a request for the at least one in-vehicle service based on the selection.

16. The method of claim 15, wherein the trip-identifying information comprises at least one of a carrier identifier that identifies a carrier, a trip identifier that identifies the trip, or a passenger identifier that identifies a passenger.

17. The method of claim 15, wherein the list of in-vehicle services comprises one or more content items that include at least one of video content, audio content, image content, an electronic book, a game, an advertisement, or an application.

18. The method of claim 15, wherein the list of in-vehicle services comprises one or more service items that include at least one of a food, a beverage, earphones, a pillow, a blanket, or Internet service.

19. The method of claim 15, the method further comprising:
receiving, at the computer system, from the user-provided device, a request for the list of in-vehicle services, wherein the current time is a time of the receipt of the request for the list of in-vehicle services, and
wherein determining whether the current time is within the predetermined boarding or pre-boarding time period comprises determining whether the time of the receipt of the request for the list of in-vehicle services is within the predetermined boarding or pre-boarding time period.

20. The method of claim 15, wherein the computer system comprises an intermediary computer device located at a facility for boarding of the vehicle, wherein the list of in-vehicle services is provided to the user-provided device via the intermediary computer device, wherein the selection of the at least one in-vehicle service is received at the intermediary computer device, and wherein the intermediary computer device is caused to:
provide the request for the at least one in-vehicle service to an in-vehicle computer system on the vehicle.

21. A method of facilitating provisioning of content items by an in-vehicle computer system on a vehicle, the method being implemented by a computer system that includes one or more physical processors executing one or more computer program instructions which, when executed, perform the method, the method comprising:
obtaining, by the computer system, trip-identifying information relating to a passenger that is associated with a user-provided device, wherein the trip-identifying information identifies a trip that is to occur on the vehicle;
determining, by the computer system, based on the trip-identifying information, a list of content items that are available for the trip to be provisioned by the in-vehicle computer system to the user-provided device;
providing, by the computer system, the list of content items to the user-provided device;
receiving, at the computer system, from the user-provided device, a selection of at least one content item from the list of content items;
generating, by the computer system, a request for the selected at least one content item based on the selection, wherein the selected at least one content item is not stored in a memory of the in-vehicle computer system at a time of the request for the at least one content item;
determining, by the computer system, that the selected at least one content item is not available at the in-vehicle computer system in response to the request for the selected at least one content item; and
providing, by the computer system, based on a determination that the selected at least one content item is not available at the in-vehicle computer system, the selected at least one content item to the in-vehicle computer system via a network for provisioning by the in-vehicle computer system to the user-provided device such that the at least one content item is stored at the memory of the in-vehicle computer system before a boarding time associated with the trip,
wherein the selected at least one content item is provided to the user-provided device before the boarding time such that the selected at least one content item is stored at the user-provided device before the boarding time, but is not accessible for playback at the user-provided device until at least the boarding time.

22. The method of claim 21, wherein the selected at least one content item is provided to the user-provided device before the boarding time via pre-loading of the selected at least one content item onto the user-provided device, and wherein playback access of the selected at least one content item via the user-provided device is enabled based on a determination that a current time has at least reached the boarding time.

23. A system for facilitating provisioning of content items by an in-vehicle computer system on a vehicle, the system comprising:

one or more physical processors programmed with one or more computer program instructions which, when executed, cause the one or more physical processors to:
obtain trip-identifying information relating to a passenger that is associated with a user-provided device, wherein the trip-identifying information identifies a trip that is to occur on the vehicle;
determine, based on the trip-identifying information, a list of content items that are available for the trip to be provisioned by the in-vehicle computer system to the user-provided device;
provide the list of content items to the user-provided device;
receive, from the user-provided device, a selection of at least one content item from the list of content items;
generate a request for the selected at least one content item based on the selection, wherein the selected at least one content item is not stored in a memory of the in-vehicle computer system at a time of the request for the at least one content item;
determine that the selected at least one content item is not available at the in-vehicle computer system in response to the request for the selected at least one content item; and
provide, based on a determination that the selected at least one content item is not available at the in-vehicle computer system, the selected at least one content item to the in-vehicle computer system via a network for provisioning by the in-vehicle computer system to the user-provided device such that the at least one content item is stored at the memory of the in-vehicle computer system before a boarding time associated with the trip,
wherein the selected at least one content item is provided to the user-provided device before the boarding time such that the selected at least one content item is stored at the user-provided device before the boarding time, but is not accessible for playback at the user-provided device until at least the boarding time.

24. The system of claim 23, wherein the selected at least one content item is provided to the user-provided device before the boarding time via pre-loading of the selected at least one content item onto the user-provided device, and wherein playback access of the selected at least one content item via the user-provided device is enabled based on a determination that a current time has at least reached the boarding time.

\* \* \* \* \*